United States Patent [19]

Mead et al.

[11] Patent Number: 4,490,245
[45] Date of Patent: Dec. 25, 1984

[54] PROCESS FOR RECLAIMING USED LUBRICATING OIL

[75] Inventors: Theodore C. Mead, Port Neches; James H. Wright, Houston, both of Tex.

[73] Assignee: Texaco Inc., White Plains, N.Y.

[21] Appl. No.: 598,100

[22] Filed: Apr. 9, 1984

[51] Int. Cl.$^3$ .............................................. C10M 11/00
[52] U.S. Cl. ..................................... 208/179; 208/92; 208/126; 208/184
[58] Field of Search ................. 208/179, 184, 186, 13, 208/126, 92

[56] References Cited

U.S. PATENT DOCUMENTS

| | | | |
|---|---|---|---|
| 3,919,076 | 11/1975 | Cutler et al. | 208/179 |
| 3,980,551 | 9/1976 | Wolk | 208/179 |
| 4,332,671 | 6/1982 | Boyer | 208/92 |
| 4,360,420 | 11/1982 | Fletcher et al. | 208/184 |
| 4,381,992 | 5/1983 | Wood et al. | 208/179 |

*Primary Examiner*—Delbert E. Gantz
*Assistant Examiner*—Anthony McFarlane
*Attorney, Agent, or Firm*—Jack H. Park; Kenneth R. Priem; Richard A. Morgan

[57] ABSTRACT

A used lubricating oil is reclaimed by vacuum distillation. The bottoms is vacuum pyrolyzed with limestone to form a virtually insoluble coked mass containing insoluble metal carbonates and free metal. This solid coked residuum is suitable for landfilling.

10 Claims, 1 Drawing Figure

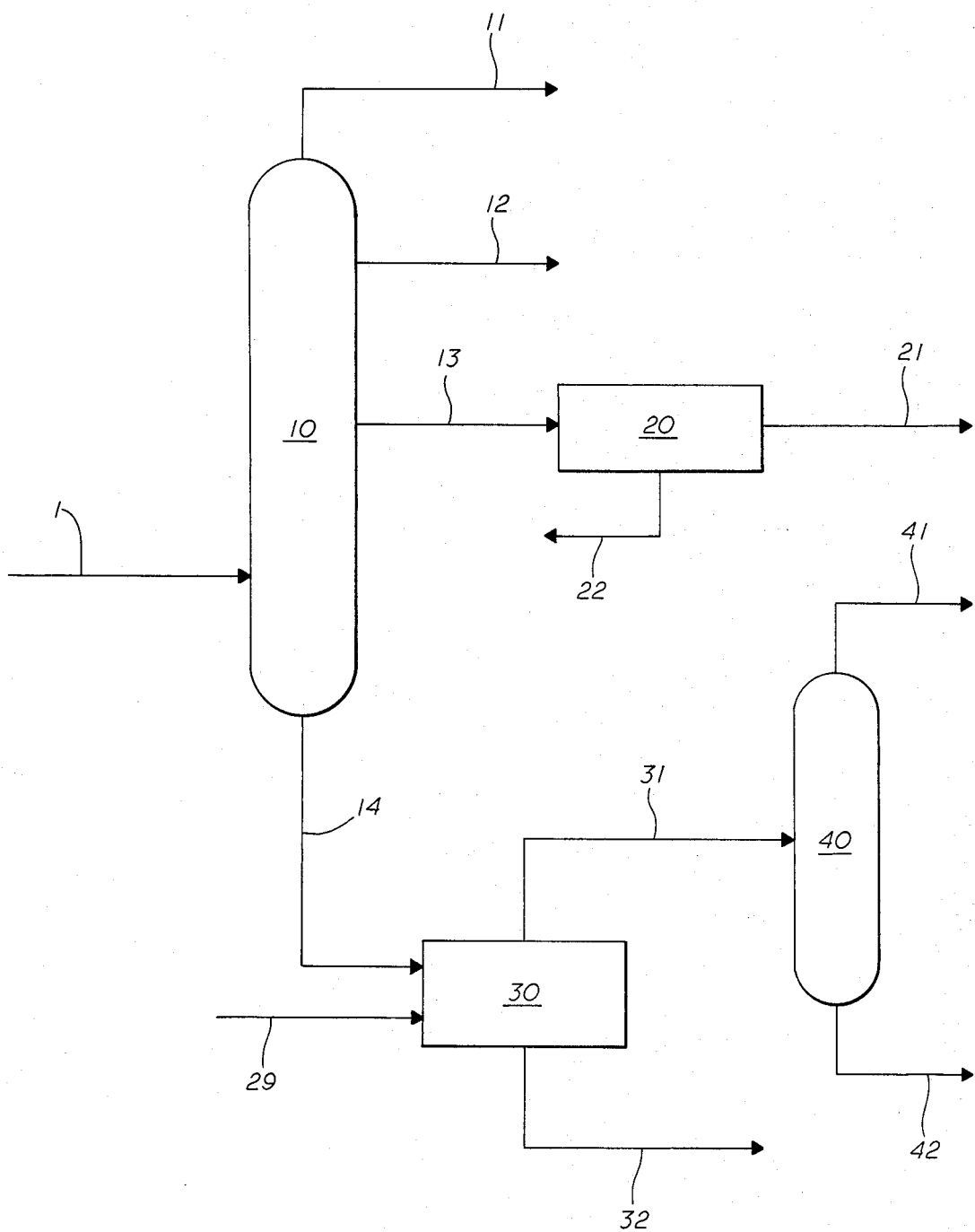

PROCESS FOR RECLAIMING USED LUBRICATING OIL

BACKGROUND OF THE INVENTION

1. Field of the Invention

This invention relates to a process for purifying used lubricating oils. More particularly this invention relates to reclaiming used lubricating oil to produce as major products a lubricating oil base stock suitable for blending and an environmentally safe solid, coked residue suitable for landfilling.

2. Description of the Prior Art

Virgin lubricating oils are derived typically from waxy petroleum distillate oil stocks. Such waxy petroleum distillate oil stocks have a viscosity of less than 50 SUS at 100° F. and have a boiling range of about 600° F. to 650° F. (315° C. to 343° C.) initial boiling point to about 1050° F. to 1100° F. (566° C. to 593° C.) end point. Such waxy petroleum distillate oil stocks may be derived from raw lube oil stocks the major portion of which boil above 650° F. (343° C.). These raw lube stocks are vacuum distilled with overhead and side draw distillate streams and a bottom stream referred to a residual oil stock. Considerable overlap in boiling ranges of distillate streams and the residual stream may exist, depending upon distillation efficiency. Some heavier distillates have almost the same distribution of molecular species as the residual stream. Both paraffinic and naphthenic crude oils are used as sources of lube oil stocks with paraffinic crudes giving the best yields of high viscosity index product, hence these are preferred for most lubricant applications.

Such distillate streams contain aromatic and polar compounds which are undesirable in lubricating oils. Such compounds are removed by means such as solvent extraction, hydrogenation and other means well known in the art, either before or after solvent dewaxing.

The wax content of a waxy distillate oil stock is defined by the amount of material to be removed to produce a dewaxed oil with a selected pour point temperature in the range of about +25° F. to −40° F. (−3.9° C. to −40° C.). Wax content of waxy distillate oil stock will vary in the range of 5 wt % to 35 wt %. Distillate oil stock is dewaxed typically by solvent dewaxing, however catalytic dewaxing processes have been found which will become industrially significant.

The dewaxed product is referred to as a lubricating oil base stock and is suitable for blending with other base stocks to achieve various desired properties. The blended base stock is then combined with additives such as soaps, E. P. agents, VI improvers and polymeric dispersants to produce an engine lubricating oil of SAE 5 to SAE 60.

After use, this oil is collected from truck and bus fleets and automobile service stations for reclaiming. Ideally this collected oil is used oil of grade SAE 5 to SAE 60 and will ordinarily contain metal containing compounds and sludge formed in the engine. However, typically when the collection is not supervised by the processor the used oil will typically contain waste grease, edible fats and oils, water and waste of unknown origin referred to broadly as undesirable components. Used lubricating oil can contain all of these components and mixtures thereof.

Crude oils which are high in distillates of the lubricating oil range are in considerable demand. They correspondingly demand a premium price. This has made reclaiming of used lubricating oils an increasingly interesting option for satisfying lubricating oil demand. It would seem that a single, best process for reclaiming used lubricating oil should have been developed which produces a reclaimed lubricating oil of acceptable quality. This is not the case. At its present state of development waste oil reclaiming is a distribution of small processors each one of which uses a different process, responsive to the waste oil available, product demand and environmental considerations in the geographic area. These different processes include as the key processing steps: chemical demetallization, specialized distillation, solvent extraction, acid treating and clay treating. These processes all suffer from a common defect, i.e., difficulty in disposing of the final metal-containing residuum in an environmentally acceptable manner.

There exists a need in the art for a lubricating oil reclaiming process which produces an oil of good quality while producing a waste stream which is environmentally acceptable, such as in a landfill.

SUMMARY OF THE INVENTION

The present invention is a process for reclaiming used lubrication oil containing metal containing compounds, sludge, and other undesirable components. The process yields as major products a lubricating oil base stock suitable for blending and a solid, coked, metal-containing residue suitable for landfilling. This process comprises the steps of:

(a) vacuum distilling the used lubricating oil at 0.1 to 20 mm Hg flash zone pressure and up to 650° F. flash zone temperature to produce a lighter key boiling between 650° F. and 1050° F. and a bottoms key;

(b) catalytically hydrogenating the lighter key at a pressure of 200 psia to 1600 psia, temperature of 450° F. to 700° F. and liquid hourly space velocity of 0.4 to 2.0 to produce a lubricating oil base stock of ASTM color less than 5.0;

(c) admixing limestone with the bottoms key in a ratio of 2:1 to 0.5:1 (wt:wt);

(d) vacuum pyrolyzing the admixture at a temperature of 1000° F. to 1200° F. and pressure of 0.1 to 5 mm Hg while drawing off vaporizable components until the solid coked, metal-containing residue remains.

BRIEF DESCRIPTION OF THE DRAWING

In the drawing is a schematic representation of a lubricating oil reclaiming process employing the improvements of the present invention. This drawing is more fully described in Example 2.

DESCRIPTION OF THE PREFERRED EMBODIMENTS

The present invention is a process for reclaiming a used lubricating oil characterized by containing metal-containing compounds, sludge and other undesirable and mixtures thereof to produce as major products a lubricating oil base stock suitable for blending and a solid coked, metal-containing residue suitable for landfilling, the process comprising:

(a) vacuum distilling the used lubricating oil at 0.1 to 20 mm Hg flash zone pressure and up to 650° F. flash zone temperature to produce a lighter key boiling between 650° F. and 1050° F. and a bottoms key;

(b) catalytically hydrogenating the lighter key at a pressure of 200 psia to 1600 psia preferably 250 psia to 400 psia, temperature of 400° F. to 700° F. and liquid hourly space velocity of 0.4 to 2.0 preferably 0.6 to 1.5 to produce the lubricating oil base stock of ASTM color less than 5, preferably less than 3;

(c) admixing limestone with the bottoms key in a ratio of 2:1 to 0.5:1 (wt:wt);

(d) vacuum pyrolyzing the admixture at a temperature of 1000° F. to 1200° F. and pressure of 0.1 to 5 mm Hg preferably 0.5 to 2 mm Hg while drawing off vaporizable components until the solid coked, metal-containing residue remains;

(e) condensing the vaporizable components and drawing off a non condensible vapor of fuel gas quality.

In accordance with the present invention, used lubricating oils are first vacuum distilled at 0.5 to 10 mm Hg pressure and up to 650° F. to produce a lighter key boiling from 650° F. to 1050° F. (corrected to atmospheric pressure) and a bottoms key. The amount of lighter key is variable with the quality of used charge oil. Typically about 70 to 85 vol % of the used charge oil is taken overhead.

The overhead component may comprise three fractions. The first is fuel gas quality boiling below 70° F. The second is fuel oil quality boiling between 70° F. and 650° F. The third, a lubricating oil fraction herein named lighter key, boiling between 650° F. and 1050° F. The first fraction is generally negligible in used oil. The second fraction is negligible in used industrial oils but may be as much as 15% in used crankcase oil in which fuel diluent is commonly found. If either of those two fractions is present, they can be combined with corresponding fractions from the pyrolysis step. They are used to fuel the rerefining process or sold.

The lighter key is then hydrogenated for the purpose of reducing sulfur content, improving color, saturating olefins and thereby increasing stability and reducing gum forming compounds.

Suitable hydrogenation catalysts are oxygen or sulfur-containing compounds such as the oxides and the sulfides of metals of Group 6 and Group 8 of the Periodic Table. Especially preferred are molybdenum oxide together with cobalt oxide and/or nickel oxide, or tungsten sulfide and nickel sulfide. The catalysts are preferably supported on a carrier such as active carbon, kieselguhr, silica, alumina and the like. The catalyst may be used in the form of tablets, pellets, extrudates and the like. Any of the commercially available hydrogenation catalysts will do, e.g., American Cyanamid HDS-3A ®.

Hydrogenation is carried out at a temperature of 450° F. to 700° F., pressure of 200 psia to 1600 psia preferably 250 psia to 400 psia and liquid hourly space velocity (LHSV) of 0.4 to 2.0 preferably 0.6 to 1.5. The results is a lubricating oil base stock suitable for blending with other base stocks and lube oil additives to produce a high quality lubricating oil product.

The bottom key is admixed with limestone. The exact amount of limestone can be determined by chemical analysis, however the relatively low cost of limestone does not justify quantitative methods and an amount of limestone to oil in the range of 2:1 to 0.5:1 (wt:wt) will give an excess of limestone that can be adjusted by experience. This can be determined by an excess of unreacted limestone in the solid residuum. The limestone can be conveniently added as a slurry, but is most economically added as a finely divided or crushed solid.

The combination of the strongly alkaline limestone effects a rapid coagulation of metallic compounds and high temperature fixes those compounds while destroying solid carbonaceous matter such as grease and slop.

Vacuum pyrolyzing the coagulant at 500° C. to 650° C. and pressure of 0.1 to 10 mm Hg preferably 0.5 to 2 mm Hg, fires the metals into virtually insoluble carbonates or unexpectedly reduces them to the elemental metal compounds. Carbonaceous slops, greases, etc. are coked with the metal to an almost dry, solid mass. Heavy metals pyrolyzed to carbonates in this manner are entirely suitable for landfilling. For example, lead carbonate has a solubility of only 0.00011 parts in 100 parts water at 20° C. Zinc carbonate is soluble to the extent of 0.001 parts per 100 parts of cold water. Once landfilled, there is no danger of these heavy metals entering the water table and they will remain safe to the end of time.

In practice, the limestone is added to the bottoms key and distillation effected, driving all vaporizable compounds overhead. In a second stage, the coagulant is vaccum pyrolyzed to coke and fuse the coagulant to an almost dry mass.

Vaporizable compounds are drawn off and condensed, with non condensibles either used as fuel gas for the vacuum pyrolysis or flared based on the utility arrangement.

The condensed fraction is simultaneously collected to produce a light hydrocarbon oil which may be blended with the lubricating oil base stock produced from the lighter key or employed as process fuel oil. The bottoms product contains metal carbonates and heavy organic components of a slop quality.

The process is noted for its low production of obnoxious and hazardous by products. In this regard, almost all by products are landfillable and environmentally not objectionable.

This invention is better shown by way of example.

EXAMPLE 1

Waste crankcase oil (100 parts) was subjected to a vacuum distillation until a residuum (17.5 parts) remained. Physical properties of charge and residuum are summarized in Table I, columns A and B. Metal containing residuum was mixed with 14 parts limestone and the mixture brought to a temperature of 1000°-1200° F. under high vacuum. Non-condensible fuel gases (2.16 parts) and light hydrocarbons (9.5 parts) were collected as overhead from this pyrolysis. The condensed hydrocarbon was entirely free of metal. Residual limestone was a tractable solid containing traces of carbonized oil. Oil-derived metals were present as extremely insoluble carbonates or, unexpectedly, as the elemental metals. The elements appear to have derived from a carbon reduction of the metal cations, according to for example the reaction:

$$2Fe_2O_3 + 3C \rightarrow 4Fe + 3CO_2 \tag{1}$$

The limestone matrix produced was entirely acceptable for landfilling in a Class A landfill.

TABLE I

| TYPICAL METAL CONTENTS OF WASTE CRANKCASE OIL AND VACUUM BOTTOMS AND COKER DISTILLATE THEREFROM | | | |
|---|---|---|---|
| Oil | A | B | C |
| Viscosity, Kin, CST at 40° C. | 59.10 | 1604 | — |

TABLE I-continued

TYPICAL METAL CONTENTS OF WASTE CRANKCASE OIL AND VACUUM BOTTOMS AND COKER DISTILLATE THEREFROM

| Oil | A | B | C |
|---|---|---|---|
| Metals | | | |
| Fe, ppm | 196.0 | 632+ | .2 |
| Pb, ppm | 357+ | 357+ | .2 |
| Cu | 12.4 | 76.1 | 0.2 |
| Si | 8.6 | 59.4 | 15.3 |
| Al | 7.4 | 79.5 | .2 |
| Cr | 1.2 | 47.2 | .2 |
| B | .2 | 7.6 | .2 |
| Ni³ | .2 | 32.4 | .2 |
| Mg | .2 | 14.6 | .2 |
| Sn | 2.1 | 50.3 | .2 |
| Ag | .02 | .02 | .02 |
| Zn | 95+ | 95+ | 2.1 |
| Ca | 93+ | 93+ | .1 |

A = Raw crankcase oil.
B = 17% vacuum bottoms.
C = light coker overhead.

EXAMPLE 2

In the drawing is shown a schematic representation of Example 1 with a projected down stream disposition of the products. 100 wt % used lube oil 1 is fed to a vacuum distillation tower 10. Neither fuel gas 11 nor fuel oil 12 is produced. The lightest product is an oil 13 (lighter key) produced in quantity of 82.5 wt %. This oil is catalytically hydrogenated in reactor 20. The product 21 of 82 wt % is lube oil blending stock. Fuel gas 22 of 0.5 wt % is also produced.

Vacuum bottoms 14 in an amount of 17.5 wt % is fed to vacuum pyrolysis 30 together with CaCO₃ 29 in an amount of 14 wt %. Solid landfill 32 in an amount of 19.84 wt % is produced. The overhead product 31 is condensed in condenser 40 to produce fuel oil 42 in an amount of 9.5 wt %. Non condensables 41 amounts to 2.16 wt % and is useful as fuel gas.

The principle of the invention and the best mode contemplated for applying the principle have been described. It is to be understood that the foregoing is illustrative only and that other means and techniques can be employed without departing from the true scope of the invention defined in the following claims.

What is claimed is:

1. A process for reclaiming used lubrication oil containing metal-containing compounds, sludge and other undesirable components, said process yields as major products a lubricating oil base stock suitable for blending and a solid coked, metal containing residue suitable for landfilling, said process comprises the steps of:
    (a) vacuum distilling the used lubricating oil at 0.1 to 20 mm Hg flash zone pressure and up to 650° F. flash zone temperature to produce a lighter key boiling between 650° F. and 1050° F. and a bottoms key;
    (b) catalytically hydrogenating the lighter key at a pressure of 200 psia to 1600 psia, temperature of 450° F. to 700° F. and liquid hourly space velocity of 0.4 to 2.0 to produce a lubricating oil base stock of ASTM color less than 5;
    (c) admixing limestone with the bottoms key in a ratio of 2:1 to 0.5:1 (wt:wt);
    (d) vacuum pyrolyzing the admixture at a temperature of 1000° F. to 1200° F. and pressure of 0.1 to 5 mm Hg while drawing off vaporizable components until the solid coked, metal-containing residue remains.

2. The process of claim 1 wherein in catalytic hydrogenating pressure is 250 psia to 400 psia.

3. The process of claim 1 wherein in catalytic hydrogenating liquid hourly space velocity is 0.6 to 1.5.

4. The process of claim 1 wherein in catalytic hydrogenating ASTM color is less than 3.

5. The process of claim 1 wherein vacuum pyrolyzing pressure is 0.5 to 2 mm Hg.

6. A process for reclaiming a used lubricating oil characterized by containing metal-containing compounds, sludge or other undesirable components or mixtures thereof to produce as major products a lubricating oil base stock suitable for blending and a solid, coked, metal-containing residue suitable for landfilling, the process comprising the steps of:
    (a) vacuum distilling the used lubricating oil at 0.1 to 20 mm Hg flash zone pressure and up to 650° F. flash zone temperature to produce a lighter key boiling between 650° F. and 1050° F. and a bottoms key;
    (b) catalytically hydrogenating the lighter key at a pressure of 200 psia to 1600 psia, 400° F. to 700° F. and liquid hourly space velocity of 0.4 to 2.0 to produce the lubricating oil base stock of ASTM color less than 5;
    (c) admixing limestone with the bottoms key in a ratio of 2:1 to 0.5:1 (wt:wt);
    (d) vacuum pyrolyzing the admixture at a temperature of 1000° F. to 1200° F. and pressure of 0.1 to 5 mm Hg while drawing off vaporizable components until the solid coked, metal-containing residue remains;
    (e) condensing the vaporizable components and drawing off a non condensible vapor of fuel gas quality.

7. The process of claim 6 wherein in catalytic hydrogenating pressure is 250 psia to 400 psia.

8. The process of claim 6 wherein in catalytic hydrogenating liquid hourly space velocity is 0.6 to 1.5.

9. The process of claim 6 wherein the ASTM color is less than 3.

10. The process of claim 6 wherein vacuum pyrolyzing is accomplished at 0.5 to 2 mm Hg.

* * * * *